(12) United States Patent  
Miller

(10) Patent No.: US 9,282,047 B2  
(45) Date of Patent: Mar. 8, 2016

(54) BATCHING COMMUNICATION EVENTS

(71) Applicant: Microsoft Technology Licensing, LLC, Redmond, WA (US)

(72) Inventor: Bryan J. Miller, London (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 14/102,376

(22) Filed: Dec. 10, 2013

(65) Prior Publication Data

US 2014/0161009 A1    Jun. 12, 2014

(51) Int. Cl.
| | |
|---|---|
| *H04L 12/851* | (2013.01) |
| *H04L 29/08* | (2006.01) |
| *H04W 52/02* | (2009.01) |
| *H04L 29/06* | (2006.01) |

(52) U.S. Cl.
CPC .......... *H04L 47/245* (2013.01); *H04L 67/2833* (2013.01); *H04L 69/28* (2013.01); *H04L 69/32* (2013.01); *H04W 52/0212* (2013.01); *H04W 52/0219* (2013.01)

(58) Field of Classification Search
None
See application file for complete search history.

(56) References Cited

U.S. PATENT DOCUMENTS

| | | | |
|---|---|---|---|
| 6,223,046 B1 | 4/2001 | Hamill-Keays et al. | |
| 7,130,906 B2 * | 10/2006 | Miyoshi et al. | 709/225 |
| 7,260,640 B1 * | 8/2007 | Kramer et al. | 709/231 |
| 7,359,971 B2 | 4/2008 | Jorgensen | |
| 8,081,626 B2 * | 12/2011 | Aithal | 370/389 |
| 8,520,529 B2 * | 8/2013 | Hutchison et al. | 370/241 |
| 8,855,047 B2 * | 10/2014 | Sammour et al. | 370/328 |
| 2007/0253358 A1 * | 11/2007 | Das et al. | 370/328 |
| 2009/0252102 A1 | 10/2009 | Seidel et al. | |
| 2010/0083255 A1 | 4/2010 | Bane et al. | |
| 2012/0023190 A1 | 1/2012 | Backholm et al. | |
| 2012/0039263 A1 | 2/2012 | Moberg et al. | |

FOREIGN PATENT DOCUMENTS

| | | |
|---|---|---|
| WO | WO-2012024030 | 2/2012 |
| WO | WO-2012071283 | 5/2012 |
| WO | WO-2012128792 | 9/2012 |

OTHER PUBLICATIONS

"Search Report", GB Application No. 1222386.3, Jun. 5, 2014, 4 pages.
"Written Opinion", Application No. PCT/US2013/074829, Dec. 4, 2014, 5 Pages.
"Intelligent VoIP and WAN Performance Alerts—SolarWinds", Retrieved From: <http://www.solarwinds.com/voip-network-quality-manager/voip-wan-performance-alerts.aspx> Aug. 31, 2012, 2012, 2 Pages.
"Quality of Service for Voice over IP", Retrieved From: <http://www.cisco.com/en/US/docs/ios/solutions_docs/qos_solutions/QoSVoIP/QoSVoIP.html> Aug. 30, 2012, Apr. 16, 2001, 29 pages.

(Continued)

*Primary Examiner* — Hong Cho
(74) *Attorney, Agent, or Firm* — Danielle Johnston-Holmes; Micky Minhas

(57) ABSTRACT

Approaches for aggregating data prior to a transmission of the data to an external system are disclosed. The method includes receiving a data bag. The data bag including data packets destined to be transmitted to an external system. A timer even is then attached to the received data bag and the received data bag is temporarily stored in a data store. The timer event associated with the received data bag is then overridden based on the timer event associated with another data bag in the data store.

20 Claims, 4 Drawing Sheets

(56) References Cited

OTHER PUBLICATIONS

Skene, et al., "Service-Level Agreements for Electronic Services", In Proceedings: IEEE Transactions on Software Engineering, vol. 36, No. 2, Mar. 29, 2010, pp. 288-304.

"International Search Report & Written Opinion for PCT Patent Application No. PCT/US2013/074829", Mailed Date: Apr. 3, 2014, Filed Date: Dec. 12, 2013, 7 pages.

"International Preliminary Report on Patentability", Application No. PCT/US2013/074829, May 8, 2015, 6 pages.

* cited by examiner

BATCHING COMMUNICATION EVENTS

This application claims priority under 35 USC 119 or 365 to Great Britain Application No. 1222386.3 filed Dec. 12, 2012, the disclosure of which is incorporate in its entirety.

BACKGROUND

Mobile devices have become mainstream and indispensable tools for the masses. The mobile devices of today are powerful and include features that previously were only available on desktop or laptop computers. Mobile devices have become so powerful that they can be used as replacements to desktop or laptop computers for most commonly used tasks such as the Internet browsing, emailing and using Internet based services. Mobile devices typically includes wireless networking, e.g., Bluetooth and Wi-Fi, to enable data communication with external systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Despite advancements in mobile devices in terms of processing power, mobile devices suffer from a major disadvantage; a shorter battery life. Mobile devices are designed to be lightweight; hence, a larger battery is unsuitable for mobile devices. It is well known that a mobile device consumes more battery power during data transmissions cycles, e.g., when Wi-Fi, Bluetooth or mobile data, especially 3G/4G, is on. To save battery power, some modern mobile device operating systems typically turn off the Wi-Fi, mobile data and Bluetooth subsystems when mobile device is not in use. A user may also manually turn on/off these subsystems. However, unless manually turned off, typically these subsystems remain in the active state when the user is using the phone interactively. Typically, at least one type of data communication mode stays on to enable external systems to communicate with the mobile device at all times.

Embodiments described herein, inter alia, advantageously extend battery life as well as make mobile devices more responsive to user events by freeing up the device processor from long data transmission operations.

Embodiments described herein include batch transmission of data from one or more applications based on factors such as user configurations and data communication events. For example, an application may be configured to aggregate outgoing data for a configured period of time and then performing a batch processing of the outgoing data. However, the system may also be configured to transmit the aggregated data early if another application is sending out some data or if some incoming data is received. The data communication subsystems (e.g., Wi-Fi) are activated only for the duration of the data transmission, thus reducing the time period for which the data communication subsystems stay on.

As used herein, in one embodiment, the term "data bag" refers a collection of data packets initiated by a same application. In other embodiments, a data bag may be configured to include data packets having same destination IP address.

In one embodiment, a method for aggregating data prior to a transmission of the data to an external system is disclosed. The method includes receiving a data bag. The data bag including data packets destined to be transmitted to an external system. A timer even is then attached to the received data bag and the received data bag is temporarily stored in a data store. The timer event associated with the received data bag is then overridden based on the timer event associated with another data bag in the data store.

In another embodiment, a computer program product comprising program code stored in a computer readable medium other than a signal per se, is disclosed, e.g. a computer-readable storage device. The program code is executable by a processor of a mobile device to cause the mobile device to implement an operation. The operation includes receiving a data bag. The data bag including data packets destined to be transmitted to an external system. The operation further includes attaching a timer event to the received data bag, temporarily storing the received data bag, and overriding the timer event based on at least one other time event associated with another data bag.

In yet another embodiment, a device is disclosed. The device includes a data manager configured to receive a data bag, wherein the data bag includes data packets destined to be transmitted to an external system and to attach a timer event to the received data bag. A data store is also included. The data store is configured to temporarily store the received data bag. The device also includes a processor configured to override the timer event based on at least one other time event associated with another data bag.

Other embodiments include, without limitation, a non-transitory computer-readable storage medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the various embodiments can be understood in detail, a more particular description, briefly summarized above, may be had by reference to embodiments, some of which are illustrated in the appended drawings. It is to be noted, however, that the appended drawings illustrate only typical embodiments and are therefore not to be considered limiting of its scope.

DETAILED DESCRIPTION

In the following description, numerous specific details are set forth to provide a more thorough understanding of the described subject matter. However, it will be apparent to one of skill in the art that the various embodiments may be practiced without one or more of these specific details. In other instances, well-known features have not been described in order to avoid obscuring the various embodiments.

Reference throughout this disclosure to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment.

Furthermore, the particular features, structures, or characteristics may be combined in any suitable manner in one or more embodiments.

Figure 1:
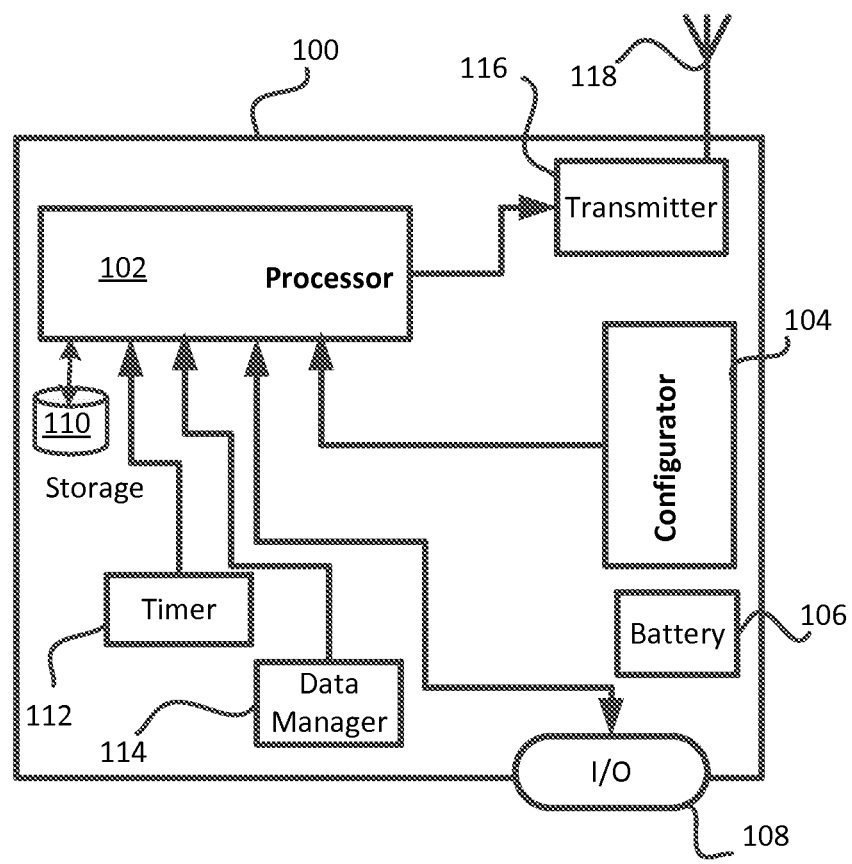
FIG. 1 illustrates a schematic of a mobile device, according to one embodiment.

FIG. 1 illustrates a schematic diagram of a mobile device 100 that includes a battery 106. In one example, the mobile device 100 may be a mobile phone device and in another embodiment, the mobile device may be a tablet computer (e.g., iPad™, Android™ Tablet, Windows™ Surface, etc.). It should be appreciated that the mobile device 100 may include other components including processor components that are required for the operation of the mobile device. However, to avoid obfuscating the teachings, the well-known components are being omitted.

Optionally further included is an input/output (I/O) port 108 for connecting the mobile device 100 to an external device, including a general purpose computer. The I/O port 108 may be used for enabling the external device to configure the mobile device 100 or to upload/download data. In one embodiment, the I/O port 108 may also be used for powering the mobile device 100 or charging the battery 106.

The mobile device 100 includes an antenna 118 that is coupled to a transmitter/receiver (Tx/Rx) module 116. The Tx/Rx module 116 is coupled to a processor 106. The antenna 118 may be fully or partly exposed outside the body of the mobile device 100. However, in another embodiment, the antenna 118 may be fully encapsulated within the body of the mobile device 100. The Tx/Rx module 116 may be configured for Wi-Fi transmission/reception, Bluetooth transmission/reception, mobile data transmission or all the above. In another embodiment, separate antennas and/or separate transmitter modules 116 may be used for Wi-Fi, Bluetooth and mobile data.

In one embodiment, when the mobile device 100 is not in use (e.g., in sleep mode), all modes of data connectivity to external systems are powered-off. However, in other embodiments, a less power-consuming mode of data connectivity may be kept alive while the mobile device 100 is in the sleep mode. Keeping at least one mode of data connectivity alive is advantageous in some scenarios. For example, if the mobile device 100 includes a communication application such as Skype™ or any other Internet chat application, it is desirable to keep a data connection alive to enable external systems to communicate with the mobile device 100. In one embodiment, enabling/disabling of communication modes may be configurable by a user.

In some embodiments, when the mobile device 100 is in the sleep mode, the mobile data connection mode is automatically downgraded, for example to 2G from 3G or 4G to save battery power. In other embodiments, even when the mobile device 100 is in use, but not for data communication, the mobile data mode is downgraded to a lower mode and then automatically switches to a higher mode when the user of the mobile device 100 attempts to send data to external systems. In one embodiment, the mobile device 100 may stay in the same lower mode if the amount of data to be transmitted is below a predetermined threshold. For example, if the mobile device 100 detects that the user is sending data through an Instant Messaging (IM) applications, which does not require increased bandwidth, the mobile device 100 may stay in a lower mode (e.g., 2G). Alternatively, if the user is using a Voice Over IP (VoIP) application, the mobile device 100 may switch to a higher mode (e.g., 4G) or connect to the Internet through an available Wi-Fi hotspot. In yet another embodiment, the amount of transmitted and received data is measured at predetermined time interval slots, e.g., the measurements are performed for a few seconds at selected time intervals. If the average data measurements are above a preselected threshold, the mobile device 100 is switched to a higher data connection mode. Similarly, if the device is already operating in a higher data connection mode, the mobile device 100 is automatically switched to a lower connection mode.

Referring back to FIG. 1 again, the mobile device 100 includes a processor 102 coupled to storage 110. The storage 110 may be used for storing programming instructions of applications installed on the mobile device 100. The storage 110 may also be used for storing data to be transmitted to an external system or data received from the external system. The storage 110 may also be used by applications to store configuration data. In addition, in one embodiment, the processor 102 may also include internal memory buffers for storing programming instructions, configurations and data at least temporarily.

The mobile device 100 may include a configurator 104 to enable data transmission configurations. For example, a user interface associated with the configurator 104 may be used for configuring maximum data retention time for individual applications or for the mobile device 100 as a whole.

A data manager 114 may be provided to hold the data to be transmitted in form of data bags or data cache. With each data bag, a configuration including maximum duration the data bag can be retained, is attached. The data manager 114 may be embodied in one of the Open Systems Interconnection (OSI) model layers. For example, the data manager 114 may be a part of the Application layer of OSI model. Having the data manager 114 in an OSI layer is advantageous because the user applications do not need to be coded specifically to include a managed data communication feature, as described herein. The data manager 114 may use the storage 110 for retaining data bags and timer configuration associated with each data bag. Alternatively, the data manager 114 may have a separate storage or memory buffer for retaining the data bags.

A timer 112 is provided to work together with the data manager 114. The timer continuously scans the data bags in the data manager 114. If the timer 112 detects that the maximum retention time has expired for a data bag, the timer 112 initiates transmission of the data bag. Prior to sending the data bag, one of the configured data communication mode (e.g., Wi-Fi, Bluetooth, 3G/4G, etc.) is powered-on or enabled and once the data bag is transmitted, the data communication mode is powered-off.

In one embodiment, when the above noted data communication mode is powered on, all data bags managed by the data manager 114 are also transmitted prior to turning off the data communication mode. Hence, in this embodiment, every time the above noted data communication mode is powered on based on the retention timer configuration associated with any data bag, all data bags under the management of the data manager 114 are transmitted to desired external systems.

In one example, suppose a user sends an email using an email account and the email account is configured using the configurator 104 in such a way that each email is retained for a first predefined period. Accordingly, a timer data (corresponding to the first predefined period) is associated with the sent email (e.g., a data bag) and retained by the data manager 114. Suppose the user then uses a different application to send another data bag that configured to be retained for a second predefined period. If the second predefined period occurs before the first configured period of time, both data bags will be transmitted when the second predefined time occurs. By combining data bags and sending them together is advantageous because a Wi-Fi or other data communication subsystem (e.g., Bluetooth) will need to be powered-on for a smaller duration of time only. It may be noted that the maximum retention time may be configured to be zero. If a data bag is configured to have the maximum retention time as zero, the data bag is transmitted immediately to the destination.

In another embodiment, two cooperating devices may work together by the way of a "request for communication" registration mechanism. In one example, a sending device, instead of sending data packets to a receiving device, the sending device sends a request for transmission to the receiving device and waits for a notification from the receiving device. During this wait, the sending device collects data packets to be sent to the receiving device. When the receiving device is ready to receive data, the receiving device sends a notification to the sending device and upon receiving this notification, the sending device sends the collected data packets. In one embodiment, data packets may be assigned a priority and high priority data packets are pushed ahead in an outgoing data packet queue at the sending device.

The batch timer and the registration-notification mechanism are advantageous because it helps the receiver to control both sending and receiving of data to maximize power saving. In one example, the mobile device 100 may have a preconfigured energy saver profile. When this profile is activated (e.g., when the mobile device 100 is low on battery power), the mobile device 100 automatically switches to use data sending and receiving periodically according to preset configurations.

Similarly, incoming data is monitored and in one embodiment, if the mobile device 100 is configured to wake up Wi-Fi or Bluetooth or 3G/4G subsystems upon receiving a data packet, while the Wi-Fi or Bluetooth or 3G/4G is still on, data bags in the data manager 114 buffer are also transmitted to their predefined destinations. It should be noted that prior to transmitting data bags, any time data added to data bags for the purpose of batching different data bags, is removed.

Figure 2:
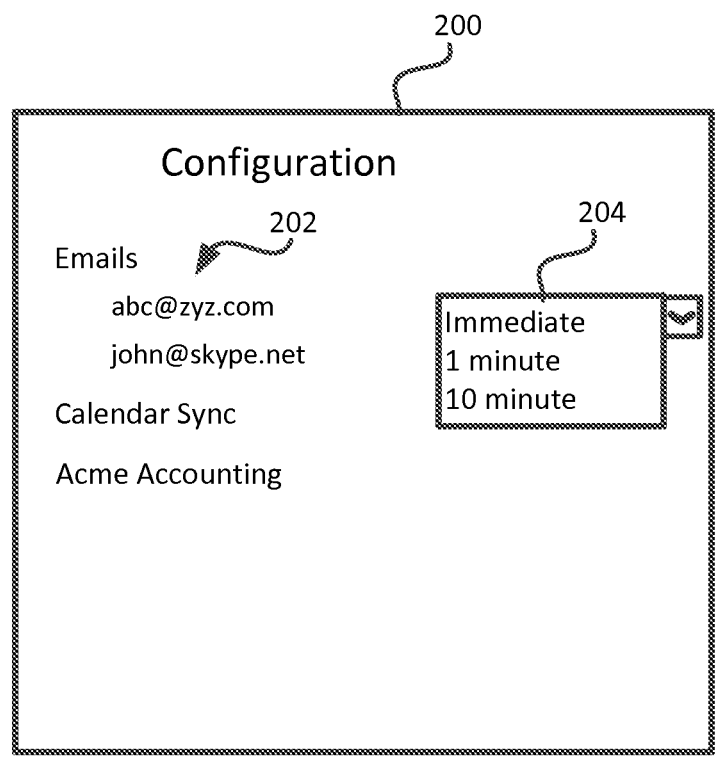
FIG. 2 illustrates an exemplary user interface for configuring data timer, according to one embodiment.

Moving to FIG. 2 that illustrates and exemplary user interface (UI) 200 for configuring maximum retention times for data originating from selected applications 202. Accordingly, the UI includes a list of at least some applications currently installed in the mobile device 100. In one embodiment, the applications may be grouped together based on their characteristics or functionality. At least some applications are associated with a control 204 to enable a user to configure maximum data retention time for a selected application. A default configuration may be provided for different types of applications. The UI 200 may also include a global data retention policy that, in absence of any application level policy, would apply to all applications.

It may be noted that the timer 112 or the data manager 114 or the configurator 104 may be software modules that are executed by the processor 102. In another embodiment, the timer 112 or the data manager 114 or the configurator 104 may be implemented in hardware.

Figure 3:
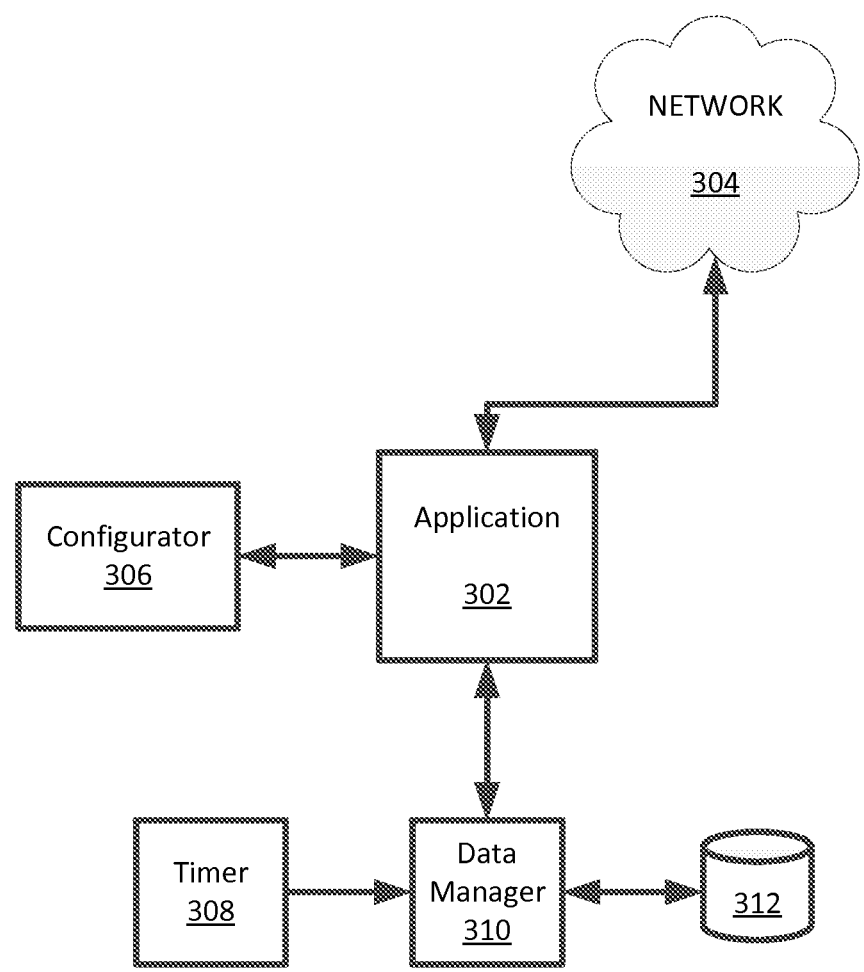
FIG. 3 illustrates an exemplary application architecture for batch transmission of data, according to one embodiment.

In another embodiment, as illustrated in FIG. 3, the data retention and communication feature may be embodied in an application instead of in the operating system or processor of the mobile device 100. An advantage of implementing the foregoing methods in an application is that no changes in the underlying software and/or hardware layers are necessary. In yet another embodiment, the timer 112, the data manager 114, and the configurator 104 may be embodied in a separate application that is accessible or can access or monitor other applications. As shown in FIG. 3, an application 302 is coupled to a configurator 306 and a data manager 310. The data manager 312 is coupled to storage 312. A time 308 is included to poll the data bags in the storage 312 and transmit the data bags when a predefined event occurs. The components shown in FIG. 3 provide the same or substantial similar functionality as the same named components illustrated in FIG. 1.

Figure 4:
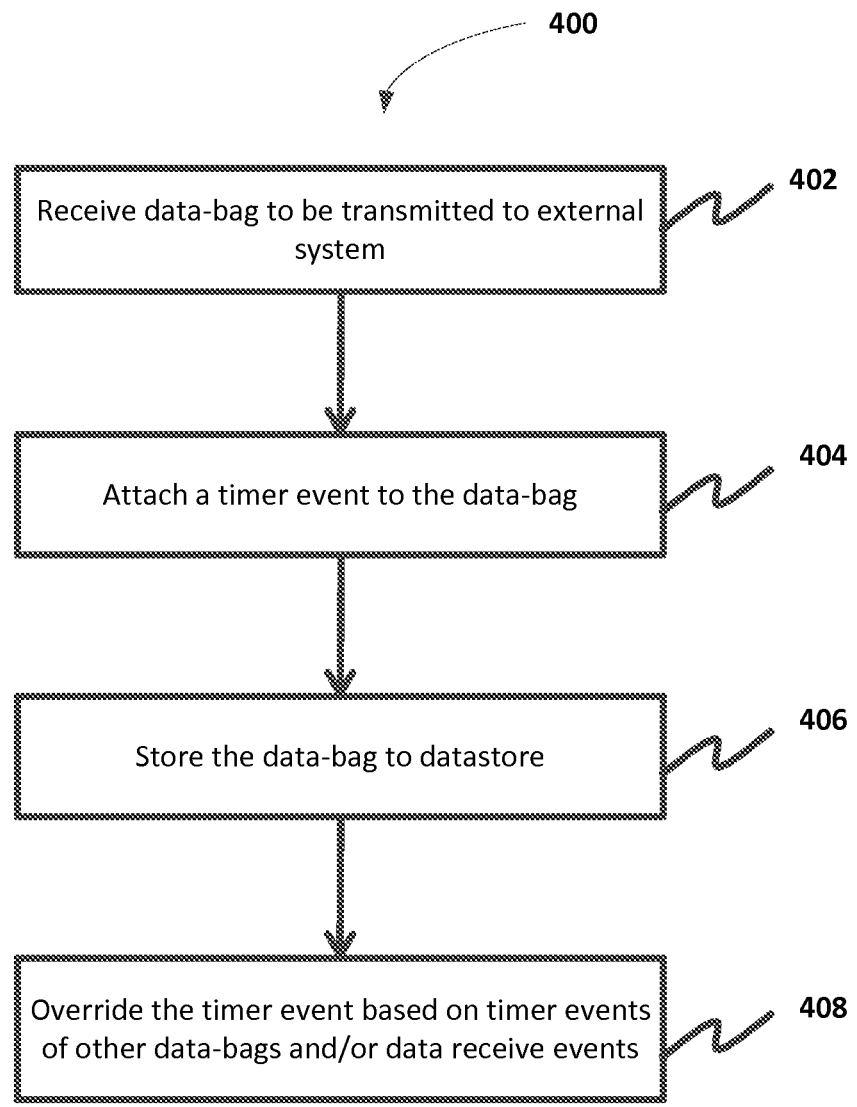
FIG. 4 illustrates a method of batch transmission of data, according to one embodiment.

FIG. 4 illustrates a method 400 of multiple data bags for a batch transmission. Accordingly, at step 402, the data manager 114 receives a data bag from an application executing in the mobile device 100. The data bag is destined to be transmitted to an external system. At step 404, a timer event is attached to the data bag. In one embodiment, the timer event is added to a temporary envelop that encapsulates the data bag. The timer event includes the maximum retention time for the data bag. At step 406, the data bag is stored in a data store coupled to the data manager 114. In another embodiment, the timer event may be attached to the data bag after the data bag is temporarily stored in the data store. The timer 112 is configured to browse through data bags in the data store at a configurable regular interval. At step 408, during the browsing process, the timer 112 checks the timer event associated with a data bag being browsed. If the temporary storage time of the data bag has exceeded the time for which the data bag was intended to be retained in the data store, according to the timer event associated with the data bag, a configured or selected data transmission mode (e.g., Wi-Fi or Bluetooth or 3G/4G, etc.) is powered on and all data bags in the data storage are transmitted to their respective destinations. Upon the completion of the transmission of all data bags in the data store, the selected data transmission mode is turned off. Also upon the completion of each data bag, the transmitted data bag is removed from the data store. In other words, the timer event associated with the data bag is merely a maximum retention time.

In another embodiment, if the mobile device 100 is configured to power on a selected data transmission mode on data reception from external systems, the data bags in the data store are also transmitted to their respective destinations when the selected data transmission mode is powered upon a data receive event.

Although the various embodiments have been described in language specific to structural features and/or methodological acts, it is to be understood that the embodiments defined in the appended claims are not necessarily limited to the specific features or acts described. Rather, the specific features and acts are disclosed as example forms of implementing the various claimed embodiments.

I claim:

1. A method, comprising:
receiving a data bag, the data bag including data packets destined to be transmitted to an external system;
attaching a timer event to the received data bag that indicates a defined period of time to retain the received data bag before transmission;
temporarily storing the received data bag; and
overriding the timer event and upgrading a transmission mode to enable transmitting of the received data bag together with at least one other data bag prior to expiration of the defined period based on another timer event associated with the at least one other data bag that indicates another defined period of time that expires before the defined period of time.

2. The method of claim 1, wherein the timer event defines a maximum time for which the received data bag is retained in a data store prior to a transmission of the received data bag to the external system.

3. The method of claim 2, wherein upgrading the transmission mode includes automatically powering on a selected data connection mode, wherein the selected data connection mode is turned off after all data bags in the data store are transmitted to their respective destinations.

4. The method of claim 3, wherein the selected data connection mode is at least one of a Wi-Fi, a Bluetooth or a 4G data connection.

5. The method of claim 1, wherein the overriding includes disregarding the timer event associated with the received data bag and transmitting the received data bag according to the other timer event associated with the at least one other data bag.

6. The method of claim 1, wherein the at least one other data bag is received prior to the data bag.

7. The method of claim 1 wherein the overriding further includes disregarding the timer event and transmitting all data stored in the data store to their respective destinations upon receiving the at least one other data bag from the external system.

8. A computer program product comprising program code stored in a computer readable storage device, the program code being executable by a processor of a mobile device to cause the mobile device to implement an operation, the operation comprising:
- receiving a data bag, the data bag including data packets destined to be transmitted to an external system;
- attaching a timer event to the received data bag that indicates a defined period of time to retain the received data bag before transmission;
- temporarily storing the received data bag; and
- overriding the timer event and transmitting the received data bag together with at least one other data bag prior to expiration of the defined period based on another timer event associated with the at least one other data bag that indicates another defined period of time that expires before the defined period of time.

9. The computer program product of claim 8, wherein the timer event defines a maximum time for which the received data bag is retained in a data store prior to a transmission of the received data bag to the external system.

10. The computer program product of claim 9, wherein the transmitting of the received data bag to an external system includes automatically powering on a selected data connection mode, wherein the selected data connection mode is turned off after all data bags in the data store are transmitted to their respective destinations.

11. The computer program product of claim 8, wherein the timer event is defined according to a preconfigured energy saver profile.

12. The computer program product of claim 8, wherein the overriding includes disregarding the timer event associated with the received data bag and transmitting the received data bag according to the other timer event associated with the at least one other data bag.

13. The computer program product of claim 8, wherein the at least one other data bag is received prior to the data bag.

14. The computer program product of claim 8, wherein the at least one other data bag is received after the data bag.

15. The computer program product of claim 8, wherein the overriding further includes disregarding the timer event and transmitting all data stored in the data store to their respective destinations upon receiving the at least one other data bag from the external system.

16. A device, comprising:
a data manager configured to:
i) receive a data bag, the data bag includes data packets destined to be transmitted to an external system;
ii) attach a timer event to the received data bag;
a data store configured to temporarily store the received data bag; and
a processor configured to:
override the timer event based on at least one other time event associated with another data bag;
power on a selected data connection mode to transmit the received data bag to an external system along with the another data bag responsive to the at least one other time event; and
power off the selected data connection mode after transmission of said data bags to their respective destinations.

17. The device of claim 16, wherein the timer event defines a maximum time for which the received data bag is retained in a data store prior to a transmission of the received data bag to the external system.

18. The device of claim 17, wherein powering on the selected data connection mode comprises switching to a higher data connection mode that increases bandwidth.

19. The device of claim 16, wherein the overriding includes disregarding the timer event associated with the received data bag.

20. The device of claim 16, wherein the processor is further configured to disregard the timer event and transmit all data stored in the data store to their respective destinations upon receiving a data bag from the external system associated with a retention time that expires prior to occurrence of the timer event.

* * * * *